(12) United States Patent
Janakiraman et al.

(10) Patent No.: US 11,057,350 B2
(45) Date of Patent: Jul. 6, 2021

(54) LAYER 2 MOBILITY FOR HYBRID MULTI-CLOUD DEPLOYMENTS WITHOUT HOST-OVERLAY

(71) Applicant: Cisco Technology, Inc., San Jose, CA (US)

(72) Inventors: Rajagopalan Janakiraman, Cupertino, CA (US); Sivakumar Ganapathy, Fremont, CA (US); Azeem Suleman, San Jose, CA (US); Mohammed Javed Asghar, Dublin, CA (US); Patel Amitkumar Valjibhai, Fremont, CA (US); Ronak K. Desai, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 16/426,336

(22) Filed: May 30, 2019

(65) Prior Publication Data
US 2020/0382471 A1 Dec. 3, 2020

(51) Int. Cl.
*H04L 29/06* (2006.01)
*H04L 12/721* (2013.01)
(Continued)

(52) U.S. Cl.
CPC ...... *H04L 63/0272* (2013.01); *H04L 12/4641* (2013.01); *H04L 45/66* (2013.01); *H04L 61/103* (2013.01); *H04L 67/28* (2013.01)

(58) Field of Classification Search
CPC . H04L 63/0272; H04L 12/4641; H04L 45/66; H04L 61/103; H04L 67/28;
(Continued)

(56) References Cited

U.S. PATENT DOCUMENTS 8,787,149 B1 * 7/2014 Ramanathan .......... H04L 45/66
370/216
8,976,792 B2 3/2015 Patel et al.
(Continued)

OTHER PUBLICATIONS

Cisco White Paper ("Deploying a Secure Hybrid Cloud Extension with Cisco CSR 1000V and LISP", C11-731872-00, Jun. 14, 2014) (Year: 2014).*

*Primary Examiner* — Chi H Pham
*Assistant Examiner* — Ji-Hae Yea
(74) *Attorney, Agent, or Firm* — Polsinelli PC

(57) ABSTRACT

Technologies for extending a subnet across on-premises and cloud-based deployments are provided. An example method may include creating a VPC in a cloud for hosting an endpoint being moved from an on-premises site. For the endpoint to retain its IP address, a subnet range assigned to the VPC, based on the smallest subnet mask allowed by the cloud, is selected to include the IP address of the endpoint. The IP addresses from the assigned subnet range corresponding to on-premises endpoints are configured as secondary IP addresses on a Layer 2 (L2) proxy router instantiated in the VPC. The L2 proxy router establishes a tunnel to a cloud overlay router and directs traffic destined to on-premises endpoints, with IP addresses in the VPC subnet range thereto for outbound transmission. The cloud overly router updates the secondary IP addresses on the L2 proxy router based on reachability information for the on-premises site.

20 Claims, 8 Drawing Sheets

(51) Int. Cl.
*H04L 12/46* (2006.01)
*H04L 29/08* (2006.01)
*H04L 29/12* (2006.01)

(58) Field of Classification Search
CPC ....... H04L 29/06; H04L 12/803; H04L 12/28; H04L 12/46; H04L 29/12; H04L 29/12028; H04L 12/462; H04L 63/0209; H04L 47/122; H04L 45/74; H04L 45/586; H04L 12/4633; G06F 9/48; G06F 9/445; G06F 9/45533; G06F 9/4856; G06F 2009/4557; G06F 9/44505; G06F 9/45504; G06F 9/45558; H06F 9/45558
See application file for complete search history.

(56) References Cited

U.S. PATENT DOCUMENTS

| | | | |
|---|---|---|---|
| 9,014,054 B2* | 4/2015 | Dunbar | H04L 12/4633 370/255 |
| 9,389,893 B2 | 7/2016 | Raghu | |
| 10,061,611 B2 | 8/2018 | Tarasuk-Levin et al. | |
| 2014/0280940 A1* | 9/2014 | Chapman | H04L 63/02 709/225 |
| 2015/0067132 A1 | 3/2015 | Naseh et al. | |
| 2015/0163152 A1* | 6/2015 | Li | H04L 41/5019 370/409 |
| 2015/0222604 A1* | 8/2015 | Ylonen | H04L 63/10 713/171 |
| 2016/0105392 A1* | 4/2016 | Thakkar | H04L 61/6022 709/220 |
| 2017/0099188 A1* | 4/2017 | Chang | H04L 63/02 709/225 |

* cited by examiner

LAYER 2 MOBILITY FOR HYBRID MULTI-CLOUD DEPLOYMENTS WITHOUT HOST-OVERLAY

TECHNICAL FIELD

The present technology pertains to cloud computing and more specifically to private address space extensions across disparate platforms in a hybrid multi-cloud fabric environment.

BACKGROUND

The ubiquity of Internet-enabled devices has created an enormous demand for Internet services and content. In the connected society of today users are increasingly reliant on network services and content. This Internet-connected revolution has created significant challenges for service and content providers who often struggle to service a high volume of user requests without falling short of user performance expectations. For example, cloud providers typically need large and complex datacenters to keep up with network and content demands from users. These datacenters are generally equipped with server farms configured to host specific services, and include numerous switches and routers programmed to route datacenter traffic and enforce a large amount of security policies. In many instances, a specific datacenter is expected to handle millions of traffic flows and enforce numerous security requirements.

Private networks owned by entities such as enterprises or organizations similarly have increasing demands for computing resources and performance. To satisfy such increasing demands, such entities often purchase computing resources and services from cloud providers. For example, such entities can create a virtual private cloud or network on a public cloud and connect the virtual private cloud or network to their private or on-premises network in order to grow their available computing resources and capabilities. In this way, the entities can interconnect their private or on-premises datacenter with a remote datacenter hosted on a public cloud, and thereby extend their private network.

Unfortunately, the lack of uniformity in the policy models and configuration restrictions between datacenter and cloud provider solutions significantly limit an entity's ability to integrate disparate environments and apply a consistent policy and routing model across datacenter environments. For example, Cisco's software-defined network and datacenter management solution, the Application-Centric Infrastructure (ACI), supports hundreds of thousands of security policies, including 128K contract rules, 64K Internet Protocol (IP) addresses, and 4K endpoint groups (EPGs) per leaf switch. By contrast, Amazon's public cloud solution, Amazon Web Services (AWS), has a restriction of 250 security rules per endpoint, which is orders of magnitude smaller than the scale of policies supported by the ACI. Consequently, the disparate policy models and configuration restrictions between cloud and datacenter solutions can significantly limit the scalability and uniformity of policies and routing in hybrid cloud implementations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
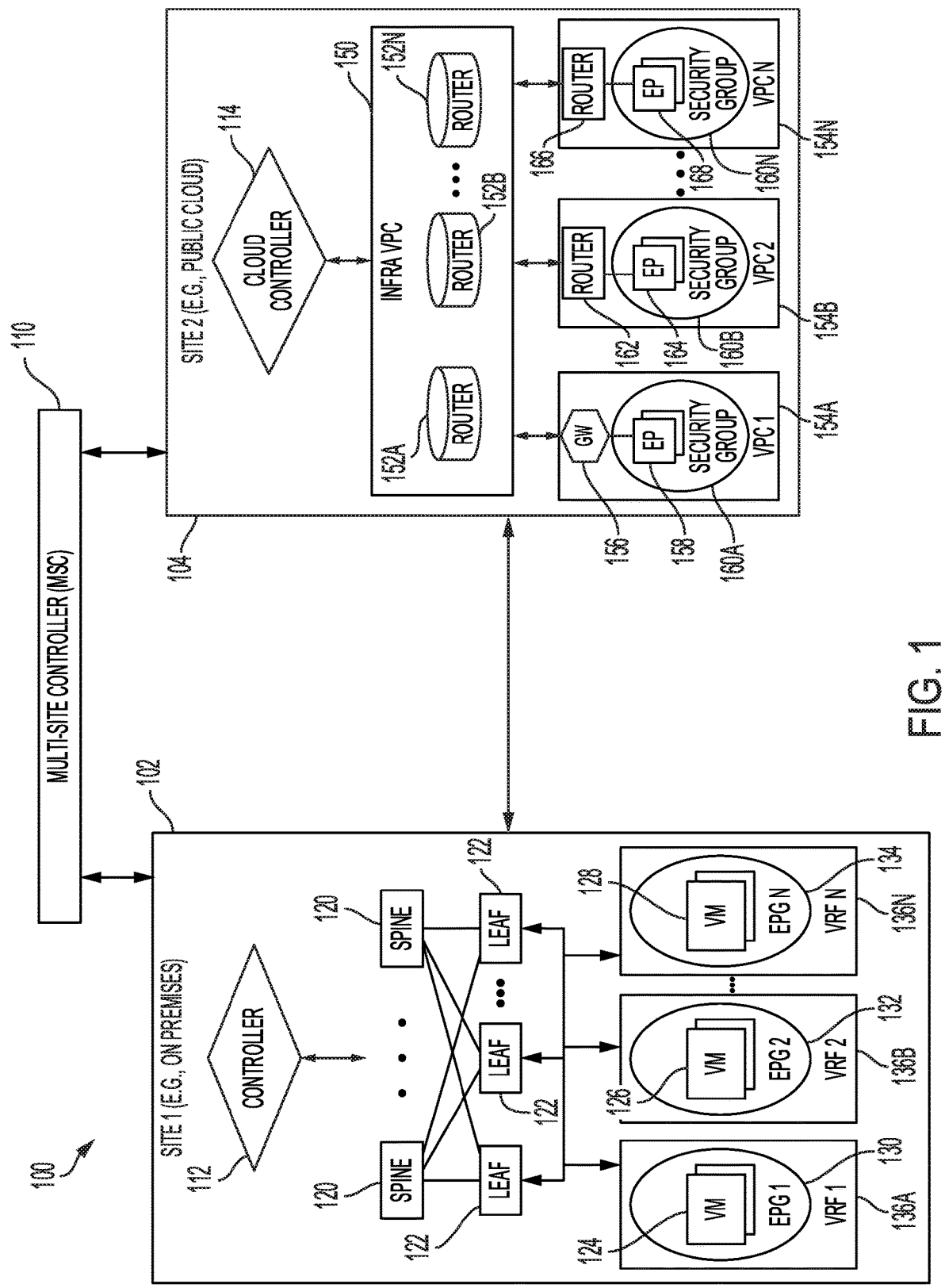
FIG. 1 illustrates an example environment for policy scaling and integration and Layer 2 mobility in a multi-cloud fabric including an on-premises site and a cloud site, in accordance with some examples of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for seamless extension of Layer 2 networks across disparate platforms in hybrid cloud fabrics. In some aspects, a method may include creating a private address space (e.g., a classless inter-domain routing (CIDR), etc.) corresponding to a routing domain (e.g., a virtual private cloud) in a cloud environment, for hosting a first endpoint moved from an on-premises site. The private address space can have an IP address range that includes or covers a first IP address assigned to the first endpoint at the on-premises site prior to the move. The method can further include configuring one or more IP addresses from the IP address range, and corresponding to one or more on-premises endpoints, as one or more secondary IP addresses in a Layer 2 (L2) proxy router instantiated in the private address space and forwarding traffic destined from the first endpoint towards the one or more secondary IP addresses to a cloud overlay router via a L2 tunnel extending from the L2 proxy router. The method can also include updating the one or more secondary IP addresses in the L2 proxy router based on a reachability state of the one or more on-premises endpoints received by the cloud overlay router.

In some aspects, a system may include one or more processors and at least one computer-readable storage medium having stored therein instructions which, when executed by the one or more processors, cause the system to: create a private address space (e.g., a CIDR, etc.) corresponding to a routing domain (e.g., a virtual private cloud) in a cloud environment, for hosting a first endpoint moved from an on-premises site. The private address space can have an IP address range that includes or covers a first IP address assigned to the first endpoint at the on-premises site prior to the move. The instructions can further cause the system to configure one or more IP addresses from the IP address range and corresponding to one or more on-premises endpoints, as one or more secondary IP addresses in a Layer 2 proxy router instantiated in the private address space and forward traffic destined from the first endpoint towards the one or more secondary IP addresses to a cloud overlay router via a L2 tunnel extending from the L2 proxy router. The instructions can also cause the system to update the one or more secondary IP addresses in the L2 proxy router based on a reachability state of the one or more on-premises endpoints received by the cloud overlay router.

In some aspects, one or more non-transitory computer-readable media includes computer-readable instructions, which when executed by one or more processors, cause the one or more processors to: create a private address space (e.g., a CIDR, etc.) corresponding to a routing domain (e.g., a virtual private cloud) in the cloud environment, for hosting a first endpoint moved from an on-premises site. The private address space can have an IP address range that includes or covers a first IP address assigned to the first endpoint at the on-premises site prior to the move. The instructions can further cause the one or more processors to configure one or more IP addresses from the IP address range and corresponding to one or more on-premises endpoints, as one or more secondary IP addresses in a Layer 2 proxy router instantiated in the private address space and forward traffic destined from the first endpoint towards the one or more secondary IP addresses to a cloud overlay router via a L2 tunnel extending from the L2 proxy router. The instructions can also cause the one or more processors to update the one or more secondary IP addresses in the L2 proxy router based on a reachability state of the one or more on-premises endpoints received by the cloud overlay router.

DESCRIPTION OF EXAMPLE EMBODIMENTS

A multi-cloud fabric or datacenter platform, such as Cisco's Application-Centric Infrastructure (ACI), can manage network, security, and services for workloads in multiple network fabrics or datacenters, such as an on-premises datacenter and one or more cloud sites. The multi-cloud platform can group endpoints into groups or collections of endpoints called endpoint groups (EPGs), and apply security policies or contracts to corresponding EPGs. In an example multi-cloud platform, an EPG can include endpoints in both the on-premises datacenter and the public cloud(s). The EPGs allow security policies or contracts to be enforced for traffic from endpoints on both the on-premises datacenter and the public cloud(s). The security policies and networking configurations can be managed by one or more controllers associated with the multi-cloud platform, such as an ACI Application Policy Infrastructure Controller (APIC) and/or a multi-site APIC.

FIG. 1 illustrates an example architecture for Layer 2 (L2) mobility and seamless interconnect functionality in a multi-cloud fabric 100. The multi-cloud fabric 100 can include an on-premises site 102 (e.g., Site 1), such as a private cloud or datacenter, and public cloud 104 (e.g., Site 2). In this example, the on-premises site 102 may implement a specific SDN or datacenter platform, such as Cisco's ACI, while the public cloud 104 may implement different cloud platforms, such as Amazon's AWS and Microsoft's Azure. In some aspects, the on-premises site 102 and the public cloud 104 can integrate with a multi-cloud or multi-fabric management platform or orchestrator which can manage and/or integrate one or more routing or security features or constructs, such as security groups (e.g., EPGs) or routing domains (e.g., virtual routing and forwarding instances, virtual private networks, subnets, etc.), across the on-premises site 102 and the public cloud 104.

The on-premises site 102 can be configured according to the specific SDN or datacenter platform implemented by the on-premises site 102, such as Cisco's ACI, which can be implemented and/or managed via one or more controllers, such as controller 112 (e.g., APIC). The controller 112 can manage security policies and interconnectivity for elements in the on-premises site 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 102. For example, the on-premises site 102 can include spine switches 120 and leaf switches 122 configured to provide network connectivity to VMs 124, 126, and 128 in the on-premises site 102. In this example, the controller 112 can manage security policies and interconnectivity for traffic processed by the spine switches 120, the leaf switches 122, and the VMs 124, 126, and 128.

The controller 112 can configure EPGs 130, 132, and 134 (EPG 1, EPG 2, EPG N), which can be used to manage and implement policies and configurations for groups of endpoints (e.g., VMs 124, 126, 128). EPGs (e.g., 130, 132, 134) are managed objects that contain endpoints (e.g., VMs, software containers, virtual appliances, servers, applications, service chains, workloads, etc.) that are connected to the network (e.g., on-premises site 102) either directly or indirectly. Each EPG (130, 132, 134) can include a group of endpoints. For example, EPG 130 can include VMs 124, EPG 132 can include VMs 126, and EPG 134 can include VMs 128.

The endpoints (e.g., VMs 124, 126, 128) in the EPGs 130, 132, 134 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs (e.g., 130, 132, 134) can span multiple switches and can be associated with respective bridge domains (BDs). In some aspects, endpoint membership in an EPG can be static or dynamic.

EPGs 130, 132, 134 can contain respective endpoint memberships and can represent different EPGs (e.g., logical groupings) that are based on different, respective factors as previously explained. For example, EPG 130 may represent a logical grouping of endpoints (e.g., VMs 124) configured as web servers (e.g., WEB-EPG), EPG 132 may represent a logical grouping of endpoints (e.g., VMs 126) configured as database servers (e.g., DB-EPG), and EPG 134 may represent a logical grouping of endpoints (e.g., VMs 128) configured as specific application servers (e.g., APP-EPG). The controller 112 can configure specific policies (e.g., contracts, filters, requirements, etc.) for each of the EPGs 130, 132, 134. Such policies or contracts can define, for example, what EPGs can communicate with each other and what type of traffic can pass between the EPGs 130, 132, 134.

The controller 112 can also configure virtual routing and forwarding (VRF) instances (136A, 136B, 136N) which provide different address domains that serve as private networks and segregate traffic between the VRFs. The VRFs 136A-N can include various, respective objects such as endpoints (e.g., VMs 124, 126, 128) EPGs (e.g., 130, 132, 134), etc. For example, VMs 124 and EPG 130 can reside in VRF 136A, VMs 126 and EPG 132 can reside in VRF 136B, and VMs 128 and EPG 134 can reside in VRF 136N. In some cases, the controller 122 can configure other types of routing domains, such as virtual private networks or subnets, in addition to, or in lieu of, VRFs.

The multi-cloud fabric 100 can also include a multi-site controller 110 (e.g., multi-site APIC) which communicates with controller 112 in the on-premises site 102 and cloud controller 114 (e.g., cloud APIC) respectively on the public cloud 104 and the public cloud 106, and works with controller 112 and cloud controller 114 to manage and implement policies and configurations on both the on-premises site 102 and the public cloud 104. The multi-site controller 110 can implement a same policy model on the on-premises site 102 and the public cloud 104, which can be based on a particular SDN or datacenter platform such as Cisco's ACI. For example, the multi-site controller 110 can implement VRFs, EPGs and associated policies on the on-premises site 102 as well as the public cloud 104. Such policies can be coordinated by the multi-site controller 110 with the controller 112 in the on-premises site 102 and the cloud controller 114 in the public cloud 104.

The public cloud 104 can also implement a different policy model and may have its own sets of requirements (e.g., policy requirements, scalability requirements, etc.) which may differ from those imposed by the platform implemented by the multi-site controller 110, the controller 112, and the cloud controller 114. The policy models and requirements on the public cloud 104 can depend on the cloud provider. For example, AWS may implement security groups and impose a 250-rule limit, and Azure may implement application or network security groups with different policy restrictions and limitations. As further described below, the approaches herein can integrate and scale routing, policies, and requirements imposed by the public cloud 104 with those associated with the multi-site controller 110, the controller 112, and the cloud controller 114, in order to apply a consistent routing and policy model and increase the scalability of the overall platform implemented on the multi-cloud fabric 100, including the public cloud 104.

The public cloud 104 can include one or more routing domains, such as virtual private clouds (VPCs) 154A, 154B, and 154N, which represent private networks on the public cloud 104 and which can be interconnected with the on-premises site 102 as described herein. The VPCs 154A, 154B, and 154N can host applications and resources on the public cloud 104 for use by the on-premises site 102. In some cases, the VPCs 154A, 154B, and 154N can represent or map to VRFs (e.g., 136A, 136B, 136N) on the on-premises site 102.

The VPCs 154A, 154B, and 154N can include endpoints (EPs) 158, 164, and 168 on the public cloud 104. For example, VPC 154A can include EPs 158, VPC 154B can include EPs 164, and VPC 154N can include EPs 168. The EPs 158, 164, 168 can include virtual/logical and/or physical endpoints, such as VMs, software containers, physical servers, etc. The EPs 158, 164, 168 can be included in service policy groups 160A, 160B, 160N, which are policy constructs implemented by the public cloud 104. In some cases, the security groups 160A, 160B, 160N can be translated to EPGs to provide consistency, integration, and/or uniformity with EPGs 130, 132, 134 in the on-premises site 102. The service policy groups 160A, 160B, 160N can include one or more respective service policies defined for traffic matching one or more attributes associated with the service groups 160A, 160B, 160N, such as IP addresses (e.g., the IP addresses of EPs 158, 164, 168 in the service groups 160A, 160B, 160N), labels (e.g., VM labels or tags), EP attributes (e.g., VM names or characteristics), IP prefixes, etc.

Traffic to and from the VPCs 154A, 154B, and 154N can be routed via routers 156, 162, and 166, which can include virtual cloud routers, virtual private gateways or VPN gateways (hereinafter "vGWs"), cloud services routers (CSR) such as Cisco CSR1 kV routers, and the like. The routers 156, 162, 166 can serve as the ingress and egress points of the VPCs 154A, 154B, 154N, and can interconnect the VPCs 154A, 154B, 154N with each other as well as other external devices or networks (e.g., on-premises site 102 and public cloud 106) through cloud routers 152A, 152B, 152N. In some examples, the routers 156, 162, 166 can serve as L2 proxy routers configured to perform tunneling and/or encapsulation functions, such as GRE (Generic Routing Encapsulation) or IPsec (Internet Protocol Security) tunneling. In other examples, the EPs 158, 164, 168 can serve as or implement L2 proxy routers configured to perform tunneling and/or encapsulation functions, such as GRE or IPsec tunneling.

The cloud routers 152A, 152B, 152N can include virtual cloud routers, virtual gateways, CSR routers such as Cisco CSR1 kV routers, and the like. The cloud routers 152A, 152B, 152N can be configured to perform control plane and/or data plane functionalities. Moreover, in some examples, the cloud routers 152A, 152B, 152N can serve as cloud overlay routers that provide overlay functions for one or more routing domains (e.g., 154A, 154B, 154N) and connect peers or endpoints from other sites, such as the on-premises site 102 and/or a different public cloud. The cloud routers 152A, 152B, 152N can be within a private network or routing domain, such as VPC 150. VPC 150 can be a hub or infra VPC, which can interconnect other VPCs, such as VPCs 154A, 154B, 154N. For example, in some cases, the cloud routers 152A, 152N, can be configured as part of a VPC 150 configured as a hub in a hub-and-spoke topology between VPC 150 and VPCs 154A, 154N, and VPCs 154A, 154N can be configured as spoke VPCs in the hub-and-spoke topology.

The routers 156, 162, and 166 can provide interconnectivity between the public cloud 104 and the on-premises site 102 through the cloud routers 152A, 152B, 152N. In some cases, the cloud routers 152A, 152B, 152N can manage the importing and exporting of routes into the on-premises site 102, the public cloud 106, the MSC 110, etc., in order to support interconnectivity between the public cloud 104 and the on-premises site 102. In some implementations, the cloud routers 152A, 152B, 152N can import and export routes using EVPN (Ethernet Virtual Private Network) BGP (border gateway protocol). In some examples, the cloud routers 152A, 152B, 152N can establish BGP sessions with the on-premises site 102 and/or the MSC 110 to exchange routes.

In some cases, as further described below, the cloud routers 152A, 152B, 152N can be mapped or designated to a specific subset of VPCs 154A, 154B, 154N in order to distribute data plane routing functionalities and responsibilities for traffic to and from the VPCs 154A, 154B, 154N amongst the cloud routers 152A, 152B, 152N. Here, the cloud routers 152A, 152B, 152N can manage the distribution of internal routes to map the cloud routers 152A, 154B, 152N to respective VPCs 154A, 154B, 154N and/or distribute the routing functionalities and responsibilities accordingly.

The MSC 110 can map the local virtual or private network (e.g., VRFs, VPCs) segment identifiers (IDs) between the on-premises site 102 and the public cloud 104 and/or between various public cloud sites, and can manage the route import and export into the corresponding virtual or private networks (e.g., VRFs, VPCs) through, for example, mapping of BGP or BGP EVPN route targets. This strategy can establish a common routing and forwarding plane for the on-premises site 102 and the public cloud 104.

As previously mentioned, the multi-cloud fabric 100 shown in FIG. 1 can include one or more additional public clouds which can implement a different policy model, environment, and/or cloud or datacenter platform as public cloud 104 and/or on-premises site 102 and which may have different requirements or limitations as public cloud 104 and/or on-premises site 102. For example, in some aspects, the on-premises site 102 may implement Cisco's ACI platform, while the public cloud 104 implements a different cloud platform, such as Amazon's AWS. Thus, cloud providers in many cases impose various resource limitations and policy restrictions which can limit the scale of resources and policies implemented in a hybrid environment such as the multi-cloud fabric 100. For example, the public cloud 104 may have significant resource limitations and policy restrictions which can limit the deployment of policies from the on-premises site 102 across the multi-cloud fabric 100 to the public cloud 104.

Fabric policy/rules on the cloud can be applied to destination endpoints and Layer 4 (L4) ports. Destination endpoints can be classified by a group, a prefix, a label, an IP address, etc., depending on the cloud or datacenter platform. While grouping endpoints or traffic based on common criteria helps in scaling security and policy rules, the different traffic categorization schemes and policy models implemented by different cloud or datacenter platforms can limit routing and forwarding uniformity and often prevent integration of fabric rules across different cloud or datacenter environments. For example, public clouds (e.g., Amazon AWS) often do not provide a Layer 2 (L2) stretch functionality. This in turn means that any fabric policy extension across such cloud sites need to be applied on Layer 3 (L3) constructs, which can become significantly limited by the cloud provider's resource scale limits as mentioned above. Furthermore, such an approach my require installation of a hypervisor to over-write the routing and forwarding restrictions that may be imposed by a public cloud provider such as the case may be with Amazon AWS. As such an overlay approach for policy extension across different platforms may not work on systems that does not allow administrator level access to the hypervisor level.

In a hybrid-cloud environment (e.g., 100) with applications stretching between on-premises data-center and the public cloud, it may not be natively possible to perform a Layer 2 network extension (e.g., for a private address space) by using just the cloud constructs. For example, Amazon Public cloud AWS imposes certain restrictions within their Virtual Private Cloud (VPC) constructs which prevents VPC data traffic destined to an IP address that falls within the assigned IP address range of the VPC to exit the VPC. Moreover there may be cloud imposed restrictions on the smallest range of IP addresses that may be assigned to a VPC instance. Such routing and forwarding policy restrictions may present significant hindrance, for example, for any client trying to stretch a subnet across an on-premise site (e.g., 102) and a public cloud (e.g., 104) or migrate a Virtual Machine (VM) from on-premise to public cloud without having to change the existing IP assignment of the VM being moved. An example is provided below to further clarify some aspects of the existing challenge followed by a description of some aspects of the disclosed technology which can address this and other challenges.

In the example scenario provided below for explanation purposes, an endpoint 'n' (e.g., endpoint with an IP address 'n') belonging to Subnet 'S' in an on-premises site (e.g., 102) is moved to a cloud (e.g., 104) in a hybrid cloud environment (e.g., 100) and needs to talk to all the endpoints within and across Subnet S, similar to when it resided in the on-premises site (e.g., 102). In order to move an endpoint (e.g., endpoint n), from an on-premises site, to a cloud site, a virtual private instance of the cloud (e.g., a VPC) corresponding to the client's routing domain (e.g., Virtual Routing and Forwarding (VRF) instance) may be created in the cloud for hosting the endpoint 'n'. Furthermore, in order for the endpoint to retain the same IP address on the cloud as it did on the on-premises site (e.g., IP address 'n'), a subnet range (e.g., a CIDR block) that contains the desired IP address ('n') may be assigned to the routing domain (e.g., VPC) created to contain the endpoint in the cloud. In this case, an ideal CIDR block may be 'n'/32 which corresponds to an IP address range consisting of a single IP address 'n'.

However, as mentioned before, certain cloud platforms such as AWS impose restrictions on the smallest CIDR range that may be created on the cloud. In the example case of AWS, the smallest allowed CIDR range corresponds to a /28 CIDR block (e.g., subnet mask 255.255.255.240) which includes 16 IP addresses. Therefore, in the example case of AWS, or similarly restricted clouds, in order to move an endpoint with an IP address 'n' from an on-premises site to a cloud site without breaking a logical subnet boundary, a CIDR (e.g., a /28 CIDR) in a routing domain (e.g., VPC) within the cloud is created and assigned to the endpoint. The CIDR in the routing domain is created in a CIDR range that includes the IP address 'n' of the endpoint. This situation, in addition to un-necessarily burning IP addresses, poses further impediments. Since traffic destined to a locally assigned IP address is not allowed to exit its host VPC, endpoint 'n' will not be able to communicate with any of its logical neighbors, still residing in the on-premises site, with IP addresses that that fall within the /28 CIDR block assigned to the VPC instance (e.g., up to a maximum of 16 devices).

Accordingly, some examples of the present technology can include a system and method for providing Layer 2 (L2) mobility in a hybrid cloud deployment between disparate platforms (e.g., between an on-premise fabric such as ACI and a public cloud system such as AWS, Azure, GCP, etc.) without requiring an overlay implementation. Therefore, in accordance to some examples of the present technology, an endpoint (e.g., a VM) may be moved from an on-premises site to a cloud site while remaining part of the same (on-premises) subnet (e.g., without requiring an IP address or address scope re-assignment). Accordingly, the VM may continue to communicate with other VMs within the same subnet residing in the on-premises site and/or other network elements deployed elsewhere in the on-premises site and/or one or more cloud sites without interruption to the interconnectivity and/or application stack.

In order to accomplish this, in accordance to some examples of the present technology, a Layer 2 proxy agent (e.g., routers 156, 162, 166) operating within the cloud networking scope (e.g., VPC in AWS or spoke-VPC in a hub-and-spoke topology) which, in this case would include the stretched portion of the subnet, may be utilized in combination with a cloud overlay router (e.g., cloud router 152A, 152B, 152N) operating within the common networking scope (e.g., infra or hub VPC 150 in a hub-and-spoke topology) to implement layer 2 mobility and intra-subnet traffic flow across cloud-based and on-premise sites. In some examples, the Layer 2 proxy agent, disposed within a spoke-VPC (e.g., 154A, 154B, 154N), for example, can be a virtual router (e.g., routers 156, 162, 166, EPs 158, 164, 168) capable of tunneling (e.g., GRE or IPsec), and the cloud overlay router can be a soft router (e.g., 152A, 152B, 152N) capable of servicing higher bandwidth and performing overlay functions (e.g., VXLAN) which may be used to interconnect multiple routing domains such as VPCs to respective peers in other on-premises sites and/or cloud sites.

In some examples, each IP address (except the IP addresses of migrated endpoints) within the VPC-assigned CIDR range (e.g., /28 CIDR block) may be represented as a secondary interface IP address in the L2 proxy router (e.g., configured as a secondary IP address on a virtualized network interface card (NIC) associated with the L2 proxy router). These IP addresses belonging to the /28 CIDR block can appear to the cloud provider (e.g., 104) as local endpoints hosted in the L2 proxy router. Therefore, any traffic sourced from the endpoint 'n' and destined to an endpoint in the /28 CIDR range can be forwarded by the cloud provider to the L2 proxy router. In some cases, since the L2 proxy router is disposed within the VPC instance associated with the CIDR range, it may be regarded as another local endpoint and assigned a loopback or management IP address from the locally assigned /28 CIDR block.

Upon receiving the traffic, the L2 proxy router can perform a routing lookup for the specified destination address based on the incoming network interface address and, if no endpoints corresponding to the specified destination address are found, the L2 proxy router can forward the traffic to a cloud overlay router (e.g., 152A, 152B, 152N) serving the segment (e.g., a cloud overlay router with reachability information to the destination IP addresses). Since the cloud overlay router is operating in the infra VPC (e.g., 150), in order to forward the traffic, the L2 proxy router encapsulates the frames in a tunnel (e.g., GRE, IPsec). A tunnel connection between the L2 proxy router and the cloud overlay router may be used for the cloud provider to forward the traffic destined for an internally-registered endpoint (e.g., an endpoint with an IP address that falls within a VPC-assigned address range) to a cloud overlay router instead of forwarding it back to the L2 proxy router or dropping the traffic.

The cloud provider may treat endpoints outside of a VPC-assigned internal address range as external endpoints (e.g., in some cloud providers such as AWS, the CIDR/subnet is the /28 prefix that includes the IP address of the endpoint being moved from an on-premises to a cloud site). Therefore, the corresponding traffic flow to such endpoint destinations may be treated as cloud external traffic for which a cloud provider may perform a lookup in its routing table for relevant forwarding information. In some examples, the routing table of a cloud provider may be programmed (e.g., with inclusion of a default route) to forward externally-bound traffic (e.g., traffic having a destination address outside of the specified CIDR/subnet range of the VPC associated with the cloud provider), to the cloud overlay router (e.g., CSR).

The cloud overlay router may run a BGP EVPN session (e.g., control plane implemented with BGP and data forwarding plane implemented using Ethernet VPN) with the on-premises routers (e.g., Spines 120) to exchange reachability information (e.g., Segment ID, destination IP address, Next-hop Identifier) for the relevant set of prefixes. In the example scenario described above, when the endpoint 'n' is moved, the cloud overlay router is signaled with the corresponding segment identifier (e.g., in a VxLAN implementation, the segment identifier may be represented by the Virtual Network ID of the corresponding VRF where the subnet S is located) and a set of associated route-targets for identifying the prefix/host routes that can be imported. Accordingly, reachability information for endpoints in Subnet S residing in other sites may be imported as host routes with the next-hop pointing to the corresponding site. Other endpoints outside of Subnet S (in the same or different VRF) which may be communicating with endpoints in subnet S may also be imported as prefix/host routes depending on how they are advertised. Consequently, the cloud overlay router may set up one or more overlay tunnels to reach the different sites where the relevant endpoints, corresponding to IP addresses both within and outside of the VPC CIDR range, may be located.

In the receiving router residing, for example, at a remote site, incoming traffic may be mapped to a corresponding routing domain (e.g., VRF domain) and an IP lookup may be performed to forward the traffic to the corresponding endpoint. According to some examples, an L2 proxy router, similar to the one set up in the cloud may be created on the on-premises sites where the subnet is located. The role of this proxy in the on-premises site is to resolve Address Resolution Protocol (e.g., map an IP address to a physical machine address that is recognized in the local network) for the endpoints that are moved. In the previous example, if an on-premises endpoint in subnet 'S' initiates an Address Resolution Protocol (ARP) request for endpoint 'n' (which was moved to a cloud site), the router in the on-premises site may reply with its own physical machine address (e.g., MAC address) so the traffic destined for endpoint 'n' can be routed to the cloud site. In some examples, in the on-premises site and/or architecture (e.g., ACI), the L2 proxy router functionality previously described can be performed by a router or an endpoint such as a VM, for example.

In some cases, only the on-premises endpoints within the VPC assigned CIDR range that are actively present in the on-premises site are represented as secondary IP addresses in the L2 proxy router on the cloud and/or the VPC on the cloud. For example, the /28 subnet that contains the endpoint IP address 'n' corresponds to a set of 16 IP addresses. However, in some cases, if at a given time only a subset of those IP addresses are assigned to active VMs or endpoints residing at the on-premises site, only those respective IP addresses are assigned as secondary IP addresses on the L2 proxy router in the VPC. For purposes of clarification, an example is provided below.

In the following example, an on-premises endpoint with an IP address of 10.0.0.10 inside a broadcast domain subnet 10.0.0.0/24 is configured within a VRF instance V1. Endpoints associated with IP addresses 10.0.0.5, 10.0.0.8, 10.0.0.20 and 20.0.0.20 also belong to the same VRF V1. In the instant example, endpoint "10.0.0.10" can be moved to the cloud (e.g., 104), while the remaining 4 endpoints listed above continue to stay on-premises (e.g., 102). This can allow the endpoint 10.0.0.10 to continue to talk to all the other endpoints based on one or more policy mechanisms.

When the endpoint move is triggered, a cloud controller (e.g., 114) may create a VPC corresponding to V1 (if it doesn't exist already) and subsequently create a closest matching CIDR for endpoint "10.0.0.10" that is allowed by the cloud provider (e.g., 10.0.0.0/28 in some examples such as the AWS cloud).

Continuing with the above example, on-premises endpoints associated with IP addresses 10.0.0.20 and 20.0.0.20 remain reachable from the endpoint 10.0.0.10 after the move since both of them reside outside the VPC's CIDR range and are considered VPC external IP addresses. Hence the traffic will be forwarded to the cloud overlay router (e.g., 152A, 152B, 152N), which may encapsulate the packet with overlay headers (e.g., VxLAN headers) and send it to the on-premises site (e.g., 102). However, in order to establish reachability to endpoints corresponding to IP addresses 10.0.0.5 and 10.0.0.8, a cloud L2 Proxy router (e.g., 156, 162, 166) with a corresponding network interface card (e.g., NIC) is created (if it doesn't exist) within the VPC as described in accordance to some examples of the present technology. Since the L2 proxy router is placed within the VPC, it is assigned an IP address from the local CIDR block 10.0.0.0/28. Furthermore, since two endpoints with an IP address within the same subnet boundary (e.g., CIDR block 10.0.0.0/28) are present at the on-premises site, the corresponding IP addresses (e.g., 10.0.0.5 and 10.0.0.8) may be assigned as secondary IP addresses to the NIC of the L2 proxy router. This will ensure that the cloud provider (e.g., AWS in the present example) forwards any packet destined from endpoint 10.0.0.10 to either endpoint 10.0.0.5 or 10.0.0.8 to the L2 Proxy router's NIC. Upon receiving the forwarded traffic, the L2 Proxy router can perform a routing lookup and since no endpoint with IP addresses 10.0.0.5 or 10.0.0.8 has been configured on the host VPC, the L2 proxy router can forward the packet to the cloud overlay router. The cloud overlay router can then perform an encapsulation (e.g., a VxLAN encapsulation) on the traffic packets and forward the packets to the on-premises site.

While EPGs are used herein to describe various aspects of the disclosure, it should be noted that other types of policy constructs, objects, and/or logical groupings can similarly be implemented as described herein. For example, in some cases, other types of security groups, managed objects or logical groups can similarly be implemented in addition to, or in lieu of, EPGs. EPGs are used herein for the sake of clarity and explanation purposes.

Figure 2A:
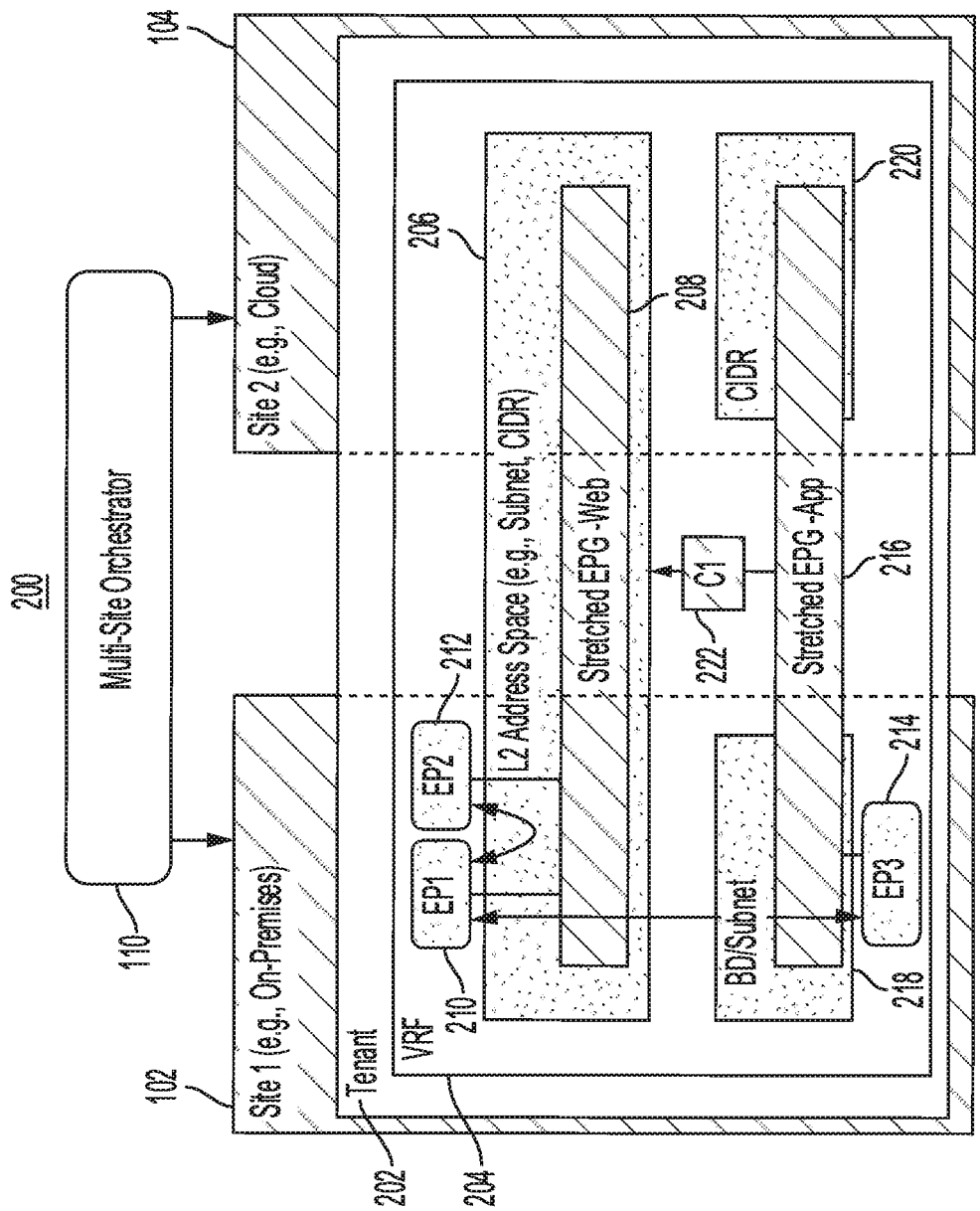
FIG. 2A illustrates an example setup of a stretched subnet/CIDR between on-premises and cloud sites, in accordance with some examples of the present technology.
Figure 2B:
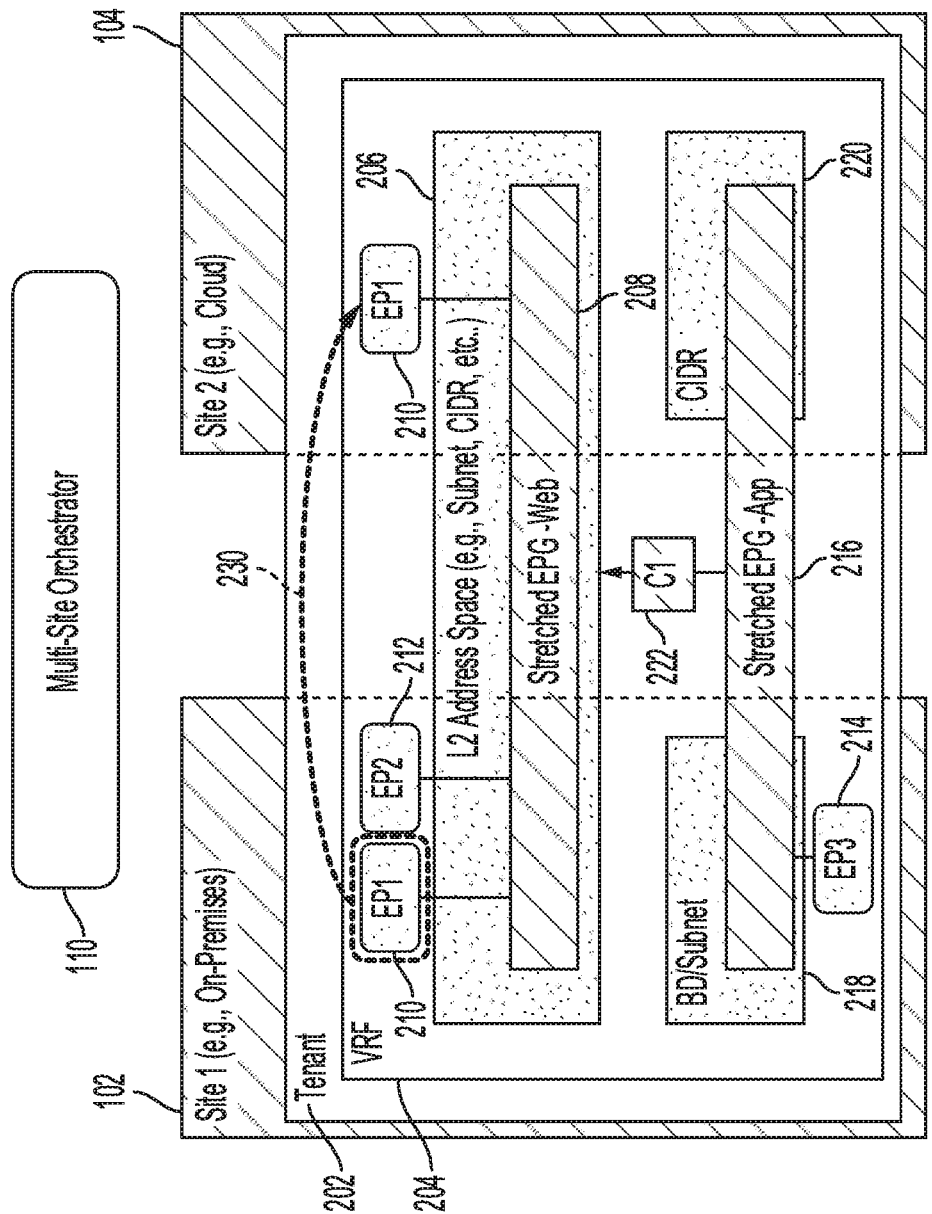
FIG. 2B illustrates an example Layer 2 endpoint mobility implementation between an on-premises site and a cloud site on a hybrid cloud or multi-cloud deployment, in accordance with some examples of the present technology.
Figure 2C:
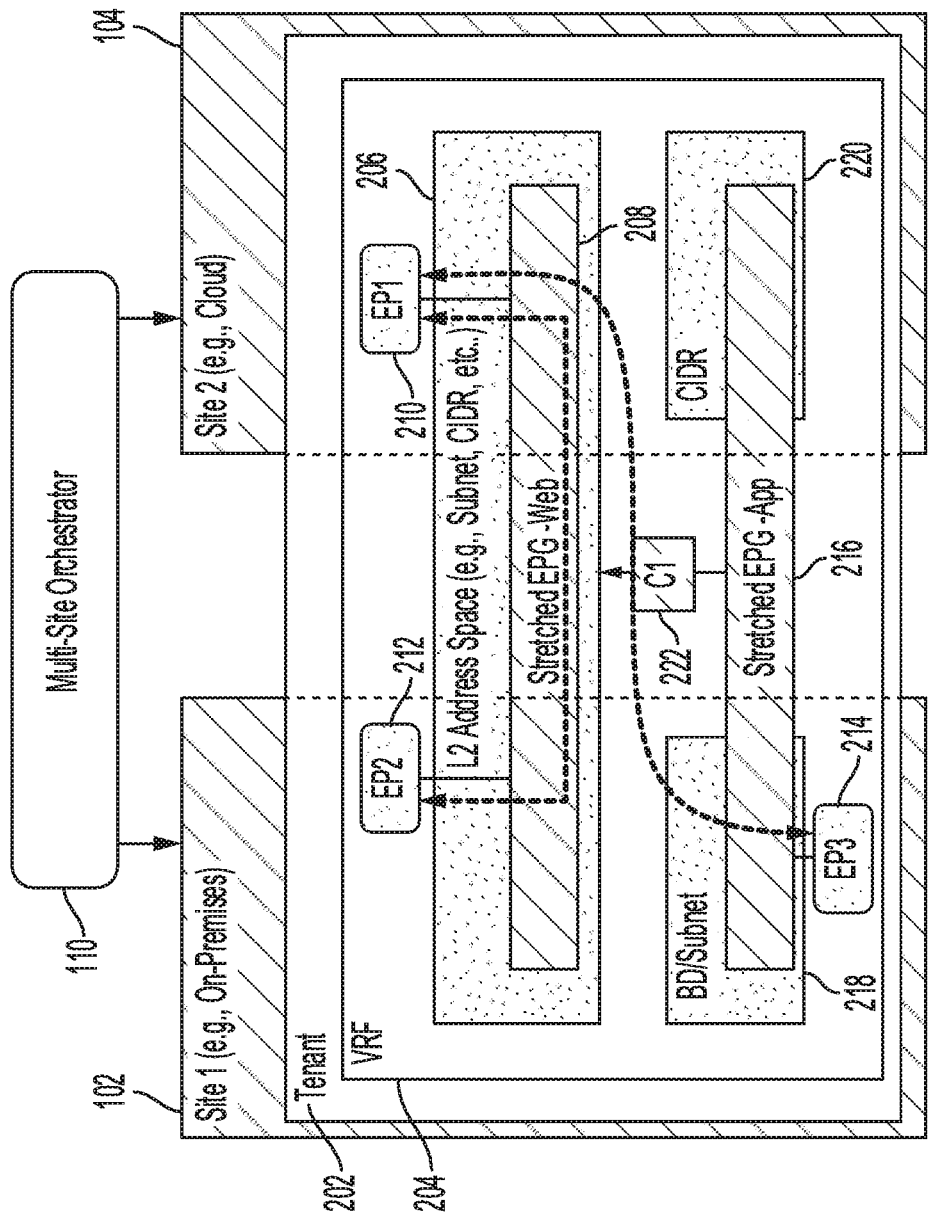
FIG. 2C illustrates an example Layer 2 intra-subnet communication between different endpoints across cloud and on-premises sites in a hybrid cloud or multi-cloud deployment, in accordance with some examples of the present technology.

FIGS. 2A-C illustrate an example setup for a tenant 202202 with a VRF domain 22204204 that extends across both an on-premise site 102 (Site 1) and a cloud site 104 (Site 2) in a hybrid cloud environment (e.g., 100). MSC 110 may be used to implement orchestration in the hybrid cloud environment (e.g., 100).

Referring to FIG. 2A, a Layer 2 private address space 206 (e.g., Subnet, CIDR, etc.) belonging to tenant 202 is stretched between the on-premises site 102 and the cloud site 104 such that, for example, a service-based grouping policy 208 (e.g., web service grouping policy) associated with endpoints 210, 212 (e.g., EP1 and EP2) in the Layer 2 private address space 206 (e.g., Subnet/CIDR) is applicable across both on-premises site 102 and cloud site 104. This is illustrated by the Stretched EPG-Web representation (208) in FIGS. 2A-C. Also configured in the VRF domain 204 is an application service grouping policy 216 that is separately applicable to endpoint 214 (e.g., EP3) in Layer 2 private address space 218 (e.g., BD/Subnet) residing in the on-premises site 102 and those within address space CIDR 220 residing in the cloud site 104. This is represented by the Stretched EPG-App (216) in FIGS. 2A-C.

A stretched EPG can include an endpoint group that expands across multiple sites. However, in some cases, endpoint groups within the same VRF instance (e.g., 204) may not be able to communicate with each other unless there is a contract in place. As such, a contract 222 (C1) may be provided to enable communication between endpoints 210, 212, 214 associated with grouping policies 208, 218 (e.g., EPG-Web and EPG-App) within VRF domain 204 (e.g. EP 210 communicating with EP 214 via contract 222 established between the stretched grouping policies 208, 218, EPG-App and EPG-Web). However, with respect to the stretched grouping policy 216 (e.g., EPG-App), in some cases, the associated endpoints in Layer 2 private address space 218 (e.g., EP 214) can be grouped with those in CIDR 220 as the two address spaces (namely Layer 2 private address space 218 and CIDR 220) are in separate, isolated Layer 2 networks. Therefore, if EP 214 is moved to CIDR 220 in cloud site 104, it will no longer retain membership to Layer 2 private address space 218 in the on-premises site 102.

However, as illustrated in FIG. 2B, EP 210 associated with stretched Layer 2 private address space 206 may be moved 230 from the on-premises site 102 to cloud site 104 without any change in its prior Layer 2 private address space (e.g., subnet) or grouping policy (e.g., EPG) affiliations. As illustrated in FIG. 2C, after moving EP 210 from the on-premises site 102 of tenant 202 to the cloud site 104, EP 210 may continue to communicate as before with its logical intra-subnet neighbors such as EP 212 still residing at the on-premises site 102 and across subnets to EP 214 through contract 222 (e.g., C1), in much the same way as before the move 230 to the cloud site 104.

Some aspects of the present technology can provide Layer 2 mobility with optimal resource addition and maximum automation. The automated process may be triggered when a user or orchestrator provides the source and destination coordinates or addresses of the endpoint that is being moved (e.g., step 302 of method 300 in FIG. 3 below). In some cases, optimal resource utilization may be achieved, at least in part, by creating a granular subnet (e.g., instead of the entire subnet S which is stretched), creating addresses in the L2 proxy router only for the live endpoints in the granular subnet, using a common cloud overlay router across a set of routing domains (e.g., VPCs) which does the overlay tunneling, using one or more endpoints (e.g., VMs) in each routing domain (e.g., VPC) as a L2 proxy router and reassigning the NICs in the L2 proxy router to wider or granular subnets as the remote endpoints start aggregating or disaggregating dynamically when the endpoint (e.g., VM) moves to the cloud.

A NIC may be reassigned to a larger Layer 2 proxy router when more addresses are needed. Similarly, multiple NICs can be aggregated into one NIC when there are fewer but scattered endpoints covering a wider subnet in the on-premises site. The controller (e.g., MSC 110) can respond to endpoints coming up in the on-premises site 102 or getting stale in the on-premises site 102 through BGP route advertisements or withdrawals.

In some examples, a L2 proxy router (e.g., 156, 162, 166), which in some examples may be implemented by an endpoint such as a VM, and a cloud overlay router (e.g., 152A, 152B, 152N) may be combined to perform Layer 2 extension without changing or imposing a specific requirement on the endpoints (e.g., VMs) running applications. In some aspects, the described technology can use an endpoint and/or L2 proxy router in a remote site to simulate a L2 stretch in a pure Layer 3 (L3) environment, can use granular subnets to minimize the Layer 2 proxy scope in the cloud, can optimally use subnet aggregation and disaggregation within the L2 proxy router to save on the number of NICs that simulate live endpoints in the same subnet in other sites, can use a control plane (e.g., BGP-EVPN host route) to dynamically maintain the state of the L2 proxy secondary addresses, and can orchestrate (e.g., via a controller such as MSC 110) deployment and/or setting up the networking (e.g., creation of one or more routing domains such as a VPC and/or subnet, deployment of a Layer 2 proxy router, instantiation of data transport tunnels from the Layer 2 proxy router to a cloud overlay router, perform route control between the cloud overlay router and routers in other sites with appropriate route-targets, etc.) based on minimal input regarding the endpoint (e.g., VM) move.

Figure 3:
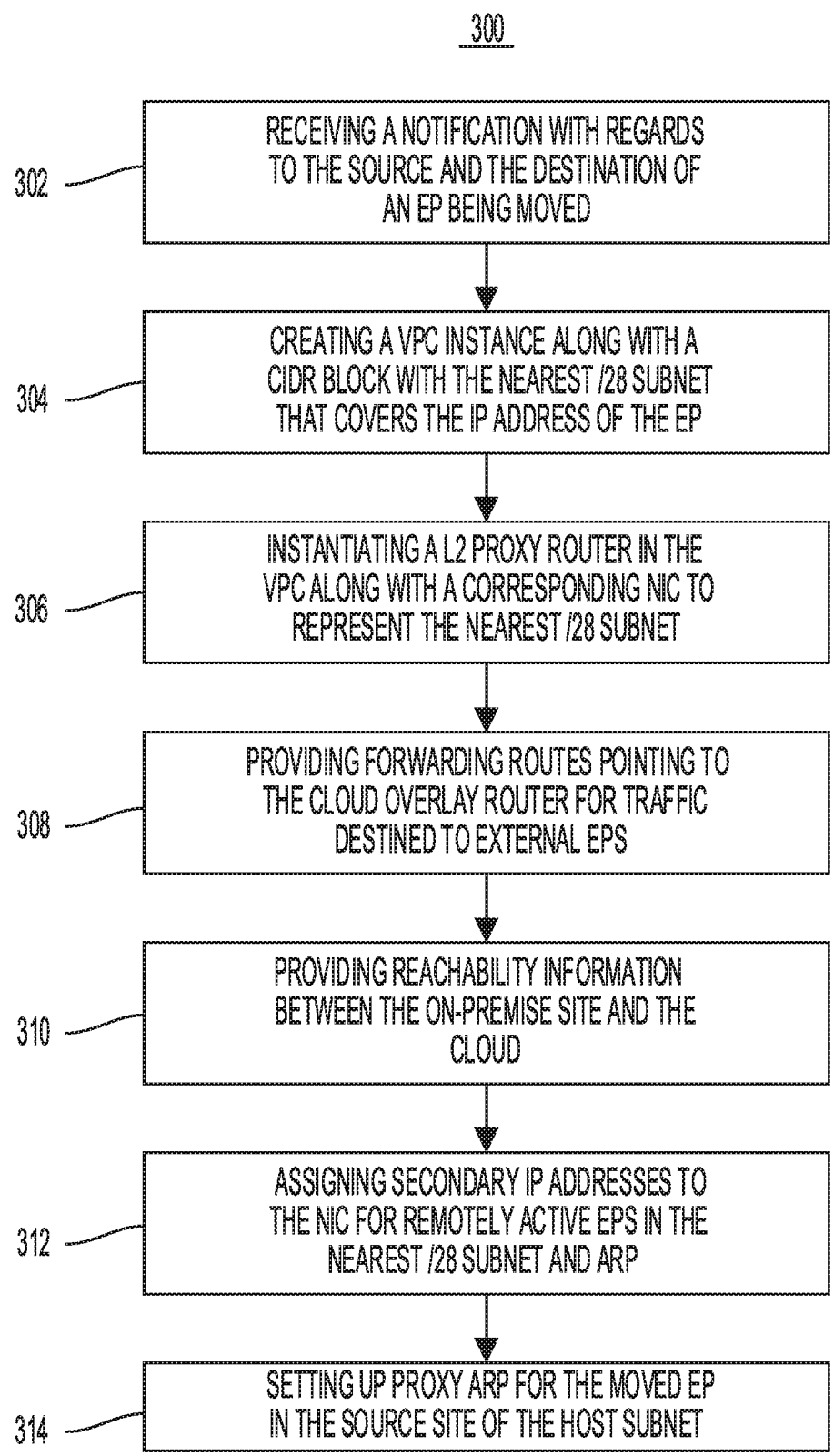
FIG. 3 illustrates an example method for extending a private address space from an on-premises site to a cloud site in a hybrid cloud deployment, in accordance with some examples of the present technology.

FIG. 3 illustrates an example method 300 for an endpoint move from an on-premises site (e.g., 102) to a cloud site (e.g., 104) without IP re-assignment, in accordance to some examples of the present disclosure. At step 302, a multi-site controller (e.g., MSC 110) receives a notification that an endpoint (EP) has been moved. The information provided to the MSC with the notification of the move may include an indication of the switch or network device serving or connected to the EP being moved (e.g., a leaf switch serving or connected to the EP prior to the move), a port on the switch or network device (e.g., the leaf switch) assigned to the EP, and an IP address of the EP, as well as the destination location of the EP being moved (e.g., the cloud and region within the cloud where the EP is being moved). Upon being alerted of the move, the MSC may look up an endpoint database (or any other type of data structure) to locate the source network segments of the EP (e.g., Bridge domain, routing domain such as VRF in ACI, etc.) and the policies (e.g., contracts in ACI) associated with the EP.

At step 304, the MSC triggers a VPC creation in the cloud (e.g., 104) for a corresponding VRF in the on-premises site (e.g., 102) if one does not already exist in the cloud. The EP, upon being moved to the cloud, may be placed within this VPC. Following the instantiation of a VPC, a CIDR block corresponding to the nearest allowed subnet (e.g., /28 CIDR block in an AWS cloud) that covers the existing IP address (e.g., on-premises assigned IP address) of the EP being moved is created and assigned to the VPC. Once the VPC and the CIDR block (e.g., corresponding to the nearest allowed subnet range) are created, at step 306, the MSC instantiates an L2 proxy router (e.g., virtual router or VM) within the VPC. The MSC may further instantiate a corresponding virtual network interface card (VNIC) within the L2 proxy router for representing the nearest allowed subnet (e.g., the /28 CIDR block).

At step 308, the MSC provides forwarding routes in the cloud provider routing table to forward traffic destined to external EPs to the cloud overlay router. In some cases, the MSC can also setup a forwarding route in the L2 proxy router pointing to a L2 tunnel that terminates at the cloud overlay router.

At 310, the MSC provides, to the cloud overlay router, reachability information between the on-premises site and the cloud. To accomplish this, the MSC can fetch the route targets of the host VRF (e.g., VRF V1 in the previous example) from all relevant sites and imports/exports them into the cloud overlay router so the cloud overlay router can exchange routes on this VRF. The MSC may also enable host route injection on a bridge domain for the host subnet of the EP in the on-premises site. This results in host routes of other endpoints in the host subnet of the EP (e.g., subnet 'S' in the previous example) to be advertised across the overlay (e.g., BGP EVPN corresponding to BGP-based route propagation and EVPN-based data forwarding).

At step 312, upon learning the BGP-advertised host routes for endpoints within the VPC assigned /28 CIDR block from a remote site (e.g., the on-premises site), the cloud overlay router configures a matching secondary IP address on the VNIC of the L2 proxy router in the VPC. When the route is withdrawn, the corresponding secondary address maybe deleted.

At step 314, the MSC sets up a proxy ARP for the moved EP in the bridge domain of the remote site (e.g., the on-premises site) where the EP used to reside and the host subnet of the EP still resides. In some cases, the proxy ARP may not be a regular proxy ARP for the entire host subnet 'S', but rather only for the endpoints that are not located within that site (e.g., EP 10.0.0.10 in the example above). With this, the networking path to/from EP 10.0.0.10 to all the endpoints (within and outside of subnet S) is fully setup. This can be achieved without introduction of host overlay configurations to re-direct the traffic in a desired fashion based on routing and forwarding logic implemented in the overlay platform.

Figure 5:
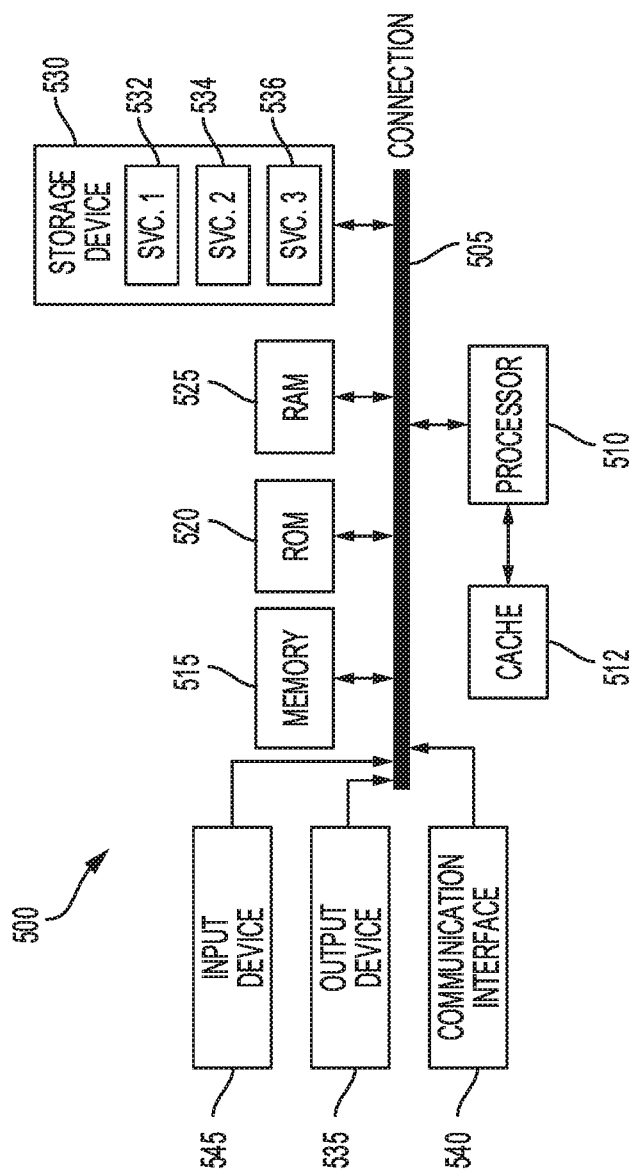
FIG. 5 illustrates an example network device in accordance with some examples of the present technology.
Figure 6:
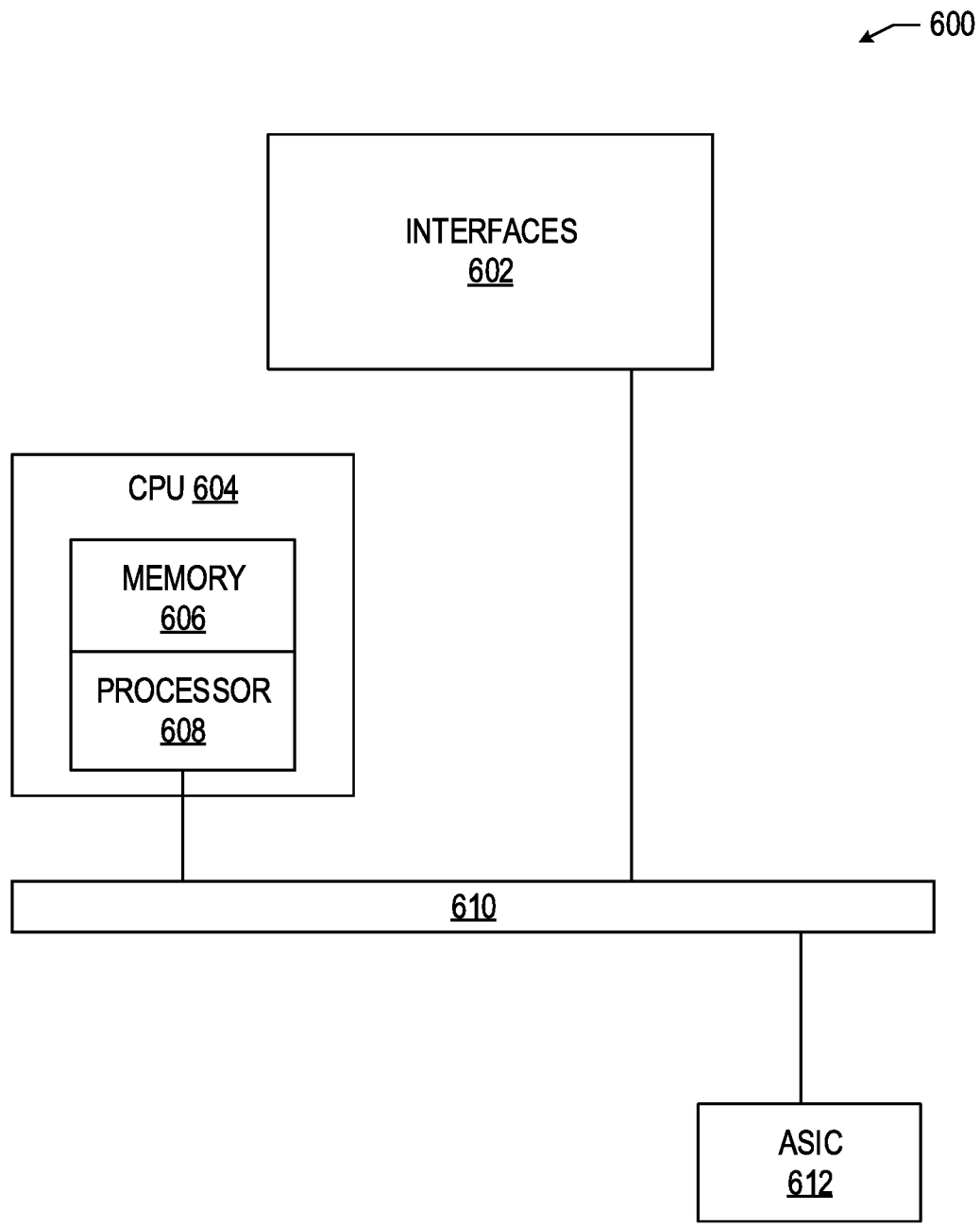
FIG. 6 illustrates an example computing device in accordance with some examples of the present technology.

The disclosure now turns to FIGS. 5 and 6, which illustrate example architectures of computing and network devices, such as client computers, switches, routers, controllers, servers, and so forth.

Figure 4:
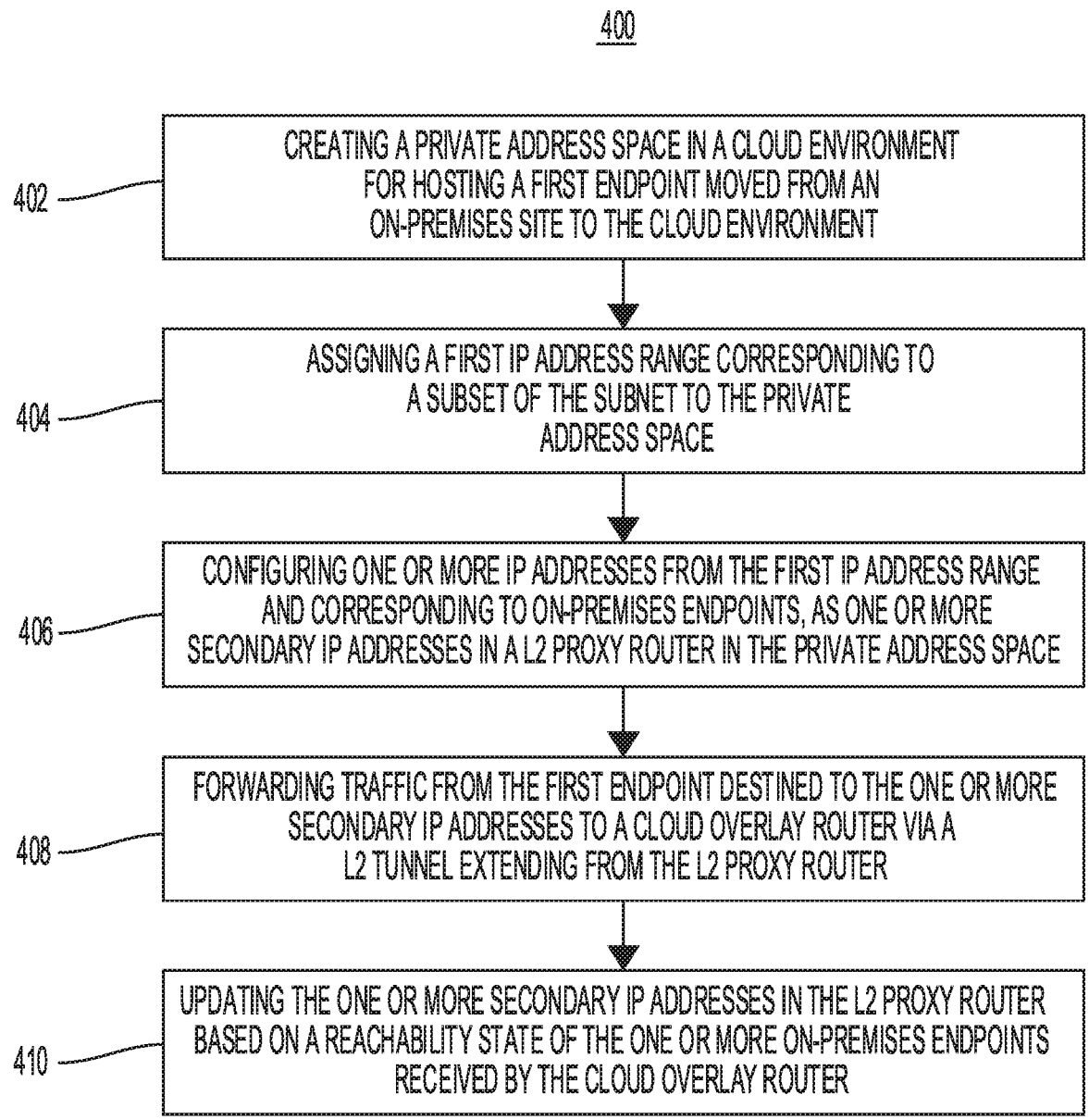
FIG. 4 illustrates an example method for Layer 2 mobility in a hybrid cloud or multi-cloud deployment, in accordance with some examples of the present technology.

FIG. 4 illustrates an example method 400 for providing L2 mobility in a multi-cloud fabric (e.g., 100) without host overlay. At step 400, the method 400 can include creating (e.g., via MSC 110) a private address space in a cloud environment (e.g., 104) for hosting a first endpoint moved from an on-premises site (e.g., 102) to the cloud environment (e.g., 104). In some cases, the first endpoint can have a first IP address belonging to a subnet of the on-premises site.

At step 404, the method 400 can include assigning a first IP address range corresponding to a subset of the subnet to the private address space. In some examples, the first IP address range can include one or more IP addresses, such as the first IP address associated with the first endpoint, belonging to the subnet of the on-premises site. In some cases, the size of the first IP address range assigned to the private address space can correspond to a minimum subnet mask restriction provided by the cloud environment.

At step 406, the method 400 can include configuring one or more IP addresses from the first IP address range and corresponding to one or more on-premises endpoints, as one or more secondary IP addresses in a L2 proxy router instantiated in the private address space. This can ensure that the cloud environment will forward to the L2 proxy router any packets from the first IP address destined to the one or more IP addresses corresponding to the one or more on-premises endpoints. The L2 proxy router can receive such packets, perform a routing lookup and forward such packets to a cloud overlay router which can perform overlay encapsulation and forwarding as described herein.

At step 408, the method 400 can include forwarding traffic from the first endpoint destined to the one or more secondary IP addresses to a cloud overlay router (e.g., 152A, 152B, 152N) via a L2 tunnel (e.g., VxLAN) extending from the L2 proxy router. The L2 proxy router can receive such packets, perform a routing lookup and forward such packets to a cloud overlay router which can perform overlay encapsulation and forwarding as previously mentioned. In some examples, the cloud overlay router can operate in a common networking scope of the cloud environment. In some cases, the cloud overlay router can reside on a hub virtual private network, such as a hub VPC (e.g., 150), and the L2 proxy router can reside on a spoke virtual private network, such as a spoke VPC in a hub-and-spoke VPC topology.

At step 410, the method 400 can include updating the one or more secondary IP addresses in the L2 proxy router based on a reachability state of the one or more on-premises endpoints received by the cloud overlay router. In some examples, the reachability state of the one or more on-premises endpoints can be received by the cloud overlay router via one or more Border Gateway Protocol sessions established between the cloud overlay router and at least one on-premises router.

In some cases, the method 400 can include providing Address Resolution Protocol (ARP) resolution for the first endpoint on the on-premises site to thereby direct data traffic destined for the first endpoint to a router associated with the on-premises site.

FIG. 5 illustrates a computing system architecture 500 which can be implemented by a computing device to perform one or more operations described herein. The computing system architecture 500 can include components in electrical communication with each other using a connection 505, such as a bus. Computing system architecture 500 includes a processing unit (CPU or processor) 510 and a system connection 505 that couples various system components including the system memory 515, such as read-only memory (ROM) 520 and random access memory (RAM) 525, to the processor 510. The computing system architecture 500 can include a cache of high-speed memory connected directly with, in close proximity to, or integrated as part of the processor 510. The computing system architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system architecture 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read-only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

FIG. 6 illustrates an example network device 600 suitable for performing switching, routing, and other networking operations. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, TCAM, etc.) also forms part of CPU 604. However, there are many different ways in which memory could be coupled to the system. In some cases, the network device 600 can include a memory and/or storage hardware, such as TCAM, separate from CPU 604. Such memory and/or storage hardware can be coupled with the network device 600 and its components via, for example, connection 610.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

In some example embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionalities described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving a request to move a first endpoint from an on-premises site to a cloud environment;
   creating, at the cloud environment, a private address space comprising an Internet Protocol (IP) address range that includes a first IP address assigned to the first endpoint at the on-premises site prior to being moved to the cloud environment;
   configuring IP addresses from the IP range as one or more secondary IP addresses in a Layer 2 (L2) proxy router instantiated within the private address space in the cloud environment, wherein the IP addresses include the first IP address assigned to the first endpoint at the on-premises site and one or more IP addresses of one or more endpoints that remain at the on-premises site after the first endpoint is moved to the cloud environment, wherein the IP address range associated with the private address space is within or corresponds to a routing domain of the one or more endpoints at the on-premises site, the L2 proxy router residing on the cloud environment; and
   after moving the first endpoint to the cloud environment, forwarding traffic destined from the first endpoint towards the one or more secondary IP addresses to a cloud overlay router via a tunnel extending from the L2 proxy router.

2. The method of claim 1, wherein the private address space comprises a virtual private cloud instance at the cloud environment.

3. The method of claim 1, wherein a size of the IP address range associated with the private address space corresponds to a minimum subnet mask restriction provided by the cloud environment.

4. The method of claim 1, wherein the Layer 2 proxy router is implemented as a virtual router, and wherein the one or more secondary IP addresses differ from a primary IP address of the Layer 2 proxy router.

5. The method of claim 1, wherein the one or more secondary IP addresses are configured on a network interface of the Layer 2 proxy router.

6. The method of claim 1, wherein the cloud overlay router comprises a virtual router operating in a common networking scope of the cloud environment.

7. The method of claim 1, wherein the IP address range comprises a subset of IP addresses of a private network domain at the on-premises site.

8. The method of claim 1, wherein a functionality of the L2 proxy router and the cloud overlay router is performed by a single cloud services router operating within the private address space in the cloud environment.

9. The method of claim 1, further comprising providing Address Resolution Protocol (ARP) resolution for the first endpoint on the on-premises site and based on the ARP resolution, directing data traffic destined for the first endpoint to a router associated with the on-premises site.

10. The method of claim 1, further comprising updating the one or more secondary IP addresses in the L2 proxy router based on a reachability state of the one or more endpoints at the on-premises site, wherein the reachability state of the one or more endpoints at the on-premises site is received by the cloud overlay router via one or more Border Gateway Protocol sessions established between at least one cloud overlay router and at least one on-premises router.

11. A system comprising:
    one or more processors; and
    at least one non-transitory computer-readable storage medium having stored therein instructions which, when executed by the one or more processors, cause the system to:
      receive a request to move a first endpoint from an on-premises site to a cloud environment;
      create a private address space comprising an Internet Protocol (IP) address range that includes a first IP address assigned to the first endpoint at the on-premises site prior to being moved to the cloud environment;
      configure IP addresses from the IP range as one or more secondary IP addresses in a Layer 2 (L2) proxy router instantiated within the private address space in the cloud environment, wherein the IP addresses include the first IP address assigned to the first endpoint at the on-premises site and one or more IP addresses of one or more endpoints that remain at the on-premises site after the first endpoint is moved to the cloud environment, wherein the IP address range associated with the private address space is within or corresponds to a routing domain of the one or more endpoints at the on-premises site , the L2 proxy router residing on the cloud environment; and
      after moving the first endpoint to the cloud environment, forward traffic destined from the first endpoint towards the one or more secondary IP addresses to a cloud overlay router via a L2 tunnel extending from the L2 proxy router.

12. The system of claim 11, wherein the private address space comprises a virtual private cloud instance at the cloud environment.

13. The system of claim 11, wherein a size of the IP address range assigned to the private address space corresponds to a minimum subnet mask restriction imposed by the cloud environment.

14. The system of claim 11, wherein the Layer 2 proxy router is implemented as a virtual router, and wherein the one or more secondary IP addresses differ from a primary IP address of the Layer 2 proxy router.

15. The system of claim 11, wherein the one or more secondary IP addresses are configured on a network interface of the Layer 2 proxy router.

16. The system of claim 11, wherein the IP address range comprises a subset of IP addresses of a private network domain at the on-premises site.

17. The system of claim 11, wherein a functionality of the Layer 2 proxy router and the cloud overlay router is performed by a single cloud router operating within the private address space in the cloud environment.

18. The system of claim 11, the at least one non-transitory computer-readable storage medium having stored therein additional instructions which, when executed by the one or more processors, cause the system to provide Address Resolution Protocol (ARP) resolution for the first endpoint on the on-premises site and, based on the ARP resolution, direct data traffic destined for the first endpoint to a router associated with the on-premises site.

19. A non-transitory computer-readable storage medium comprising:

instructions stored therein which, when executed by one or more processors, cause the one or more processors to:
- receive a request to move a first endpoint from an on-premises site to a cloud environment;
- create a private address space in the cloud environment for hosting a first endpoint to be moved from the on-premises site to the cloud environment, wherein the first endpoint is associated with a first Internet Protocol (IP) address belonging to an on-premises subnet associated with the on-premises site;
- assign, to the private address space, a first IP address range that at least partially overlaps with the on-premises subnet, wherein the first IP address range includes the first IP address and one or more IP addresses of one or more endpoints that remain at the on-premises site after the first endpoint is moved to the cloud environment;
- configure IP addresses from the first IP address range as secondary IP addresses in a Layer 2 (L2) proxy router instantiated in the private address space in the cloud environment, wherein the L2 proxy router resides on the cloud environment; and
- after moving the first endpoint to the cloud environment, forward traffic destined from the first endpoint towards the secondary IP addresses to a cloud overlay router via a L2 tunnel extending from the L2 proxy router.

20. The non-transitory computer-readable storage medium of claim 19, wherein the instructions, when executed by the one or more processors, cause the one or more processors to:
- update the secondary IP addresses in the L2 proxy router based on a reachability state of the one or more endpoints on the on-premises site, wherein the reachability state of the one or more endpoints on the on-premises site is received by the cloud overlay router via one or more Border Gateway Protocol sessions established between at least one cloud overlay router and at least one on-premises router.

* * * * *